United States Patent

[11] 3,566,044

[72] Inventor James Ronald Cross
Montreal, Quebec, Canada

[21] Appl. No. 677,254
[22] Filed Oct. 23, 1967
[45] Patented Feb. 23, 1971
[73] Assignee The Bell Telephone Co. of Canada
Montreal, Quebec, Canada

[54] TIME-OUT CIRCUIT FOR KEY TELEPHONE SYSTEMS
6 Claims, 3 Drawing Figs.

[52] U.S. Cl. ........ 179/99
[51] Int. Cl. ........ H04m 1/00
[50] Field of Search ........ 179/27 (FH), 99

[56] References Cited

UNITED STATES PATENTS

| | | | |
|---|---|---|---|
| 2,812,386 | 11/1957 | Carter | 179/99 |
| 3,239,610 | 3/1966 | Morse et al. | 179/42 |
| 3,283,083 | 11/1966 | McLeod | 179/99 |
| 3,406,262 | 10/1968 | Grandstaff | 179/84 |
| 3,436,488 | 4/1969 | Barbato et al. | 179/99 |

*Primary Examiner*—William O. Cooper
*Attorney*—Curphey and Erickson

ABSTRACT: This invention relates to a timeout circuit for use with key telephone systems which provides timeout of the audible and visual signals in key telephone equipments within a predetermined time interval after ringing current has stopped on all the other central office lines sharing the same timeout circuit.

The timeout circuit comprises neon lamps located one in each central office or private exchange line and coupled to a common photoconductive cell, and a time delay circuit energized by the photoconductive cell in response to ringing current in any of the line for holding the audible and visual signalling energized and responsive to the stopping of the ringing current in all of the lines for releasing the audible and visual signalling within a predetermined time interval.

*INVENTOR*
J. R. CROSS

AGENTS
*Curphey & Erickson*

INVENTOR
J.R. CROSS

AGENTS
Curphey & Erickson

INVENTOR
J. R. CROSS
AGENTS
Curphey & Erickson

TIME-OUT CIRCUIT FOR KEY TELEPHONE SYSTEMS

This invention relates to key telephone systems and more particularly to a novel timeout circuit for use with key telephone systems.

In current key telephone systems ringing current from the central office energizes a relay which controls audible and visual signalling. If the line is answered, the above-mentioned relay is released and the audible and visual signalling is stopped. If the call is not answered, a timeout circuit which is common to a number of lines operates after a predetermined time interval to deenergize the above-mentioned relay. However, if another line sharing the same timeout circuit is in use, the relay will remain energized and the audible and visual signals will continue until such line is released and the timeout circuit times out.

The audible and visual signals of a line using key telephone equipment, once initiated, are no longer controlled by the central office ringing current. The existing key telephone system has no way of sensing that central office ringing current has stopped. A line may, therefore, continue to ring even though the call has been abandoned.

This problem can be rectified, to some extent, by providing individual timeout circuits for each line or for groups of two or more lines. This, however, consumes valuable space on the customers premises and adds to the cost of the installation.

It is a feature of the present invention to provide timeout of the audible and visual signals in key telephone equipments within a predetermined time interval after ringing current has stopped on all the other central office lines sharing the same timeout circuit. The novel timeout circuit will time out even if other lines sharing the same timeout circuit are in use as long as they are not ringing.

The timeout circuit comprises neon lamps located one in each central office or private exchange line and coupled to a common photoconductive cell, and a time-delay circuit energized by the photoconductive cell in response to ringing current in any of the line for holding the audible and visual signalling energized and responsive to the stopping of the ringing current in all of the lines for releasing the audible and visual signalling within a predetermined time interval.

Figure 1:
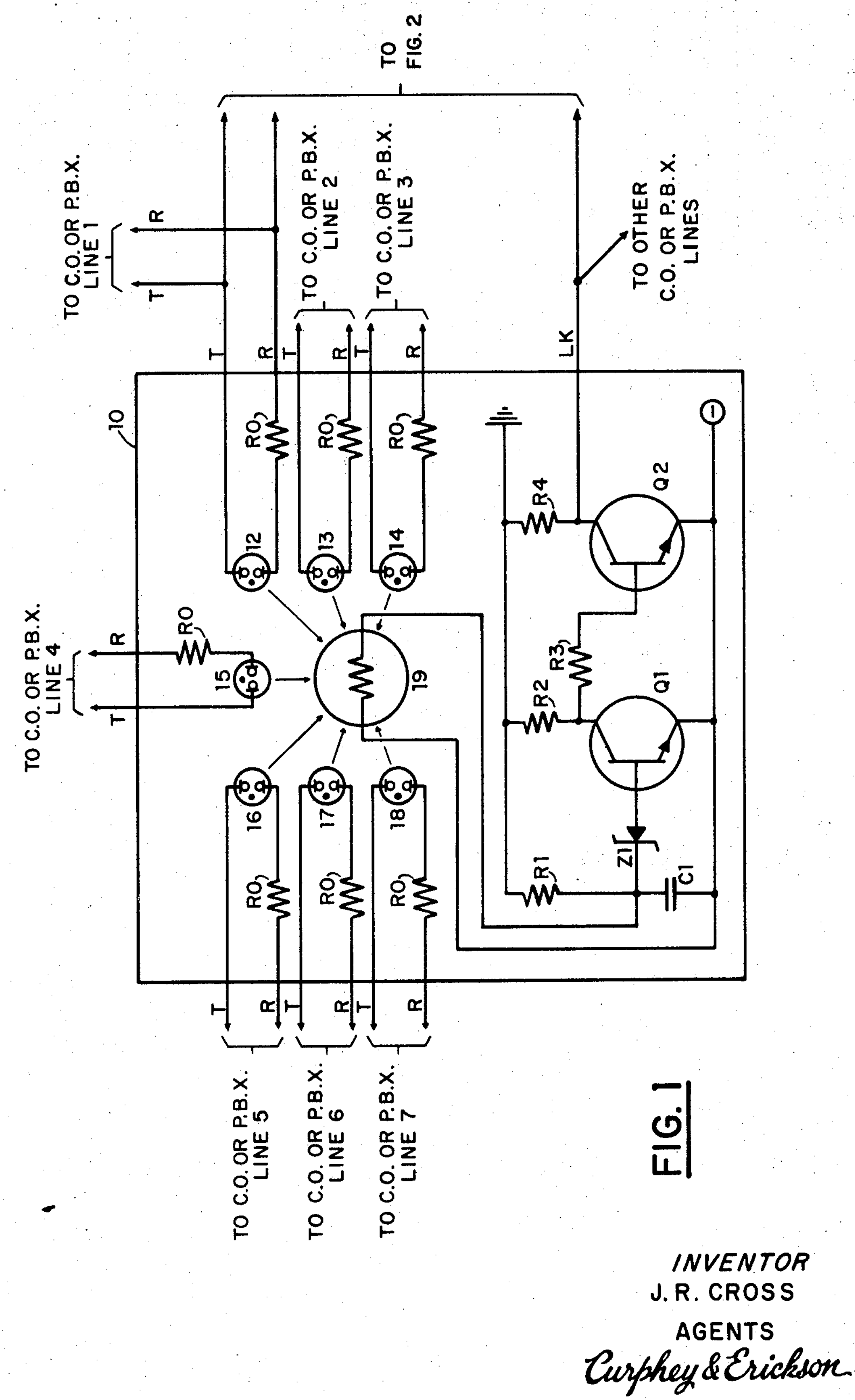
Figure 2:
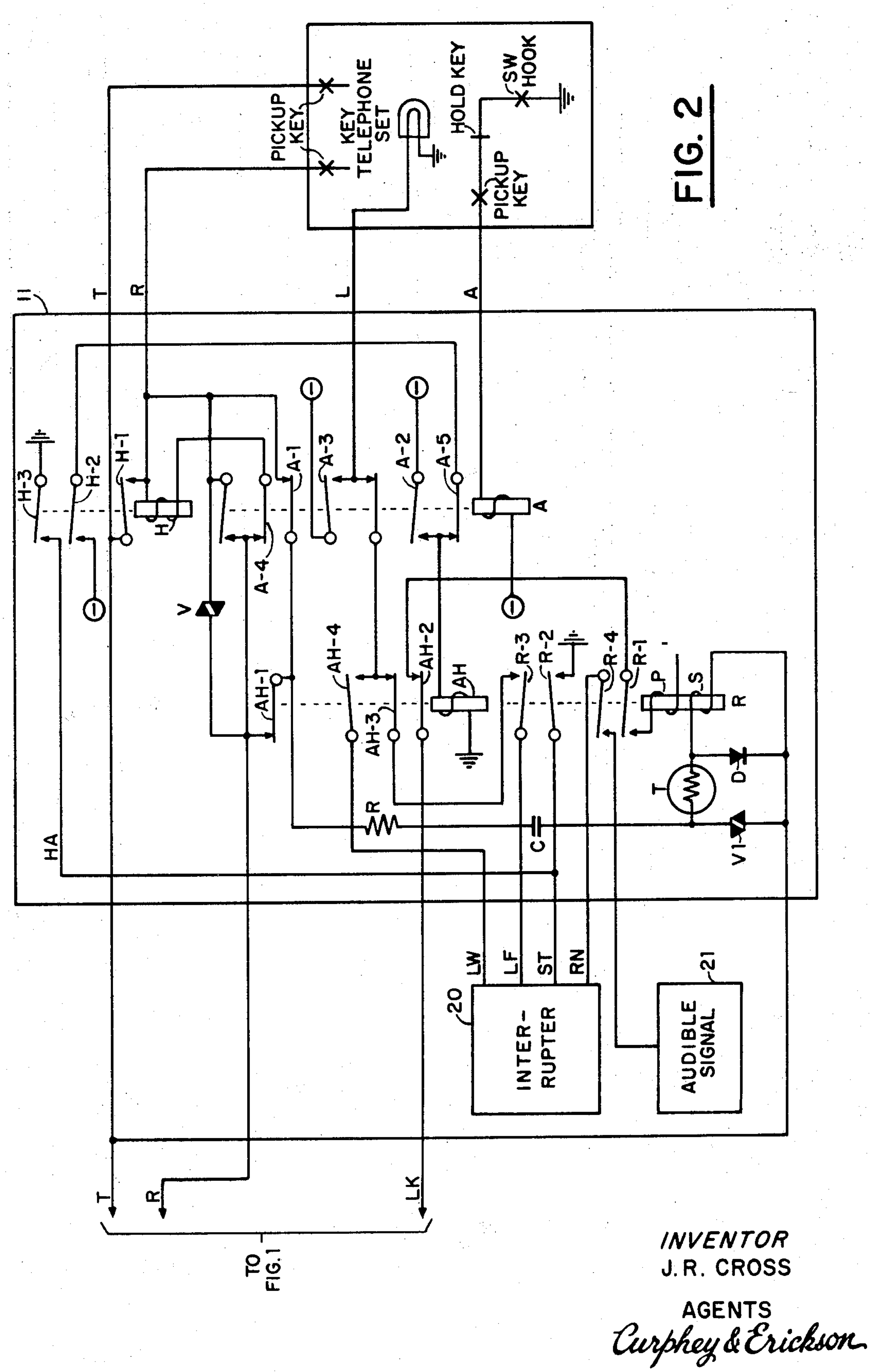
Figure 3:
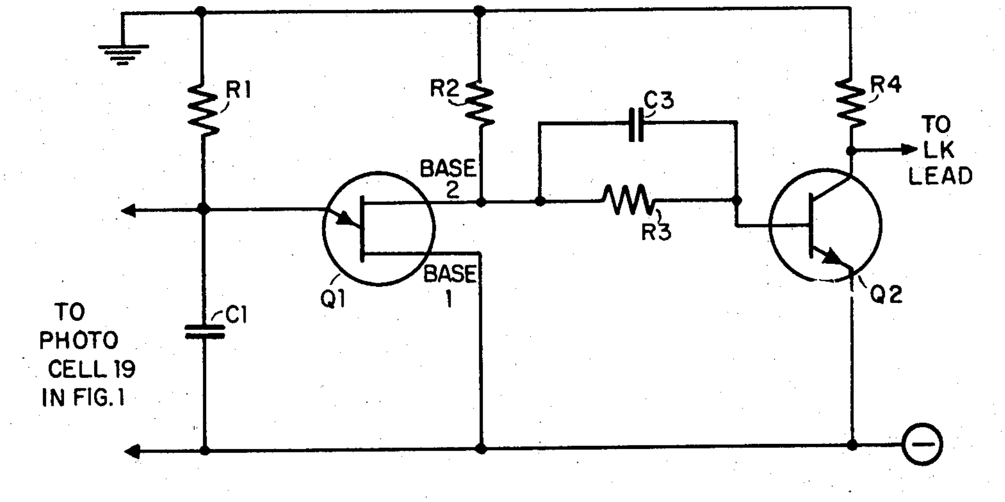

The invention will now be described with reference to the accompanying drawings in which:

FIGS. 1 and 2 illustrate a first embodiment of a timeout circuit adapted for connection to a conventional central office or private exchange line circuit; and FIG. 3 illustrates a second time-delay circuit which may be used in the timeout circuit of the invention.

FIG. 1 of the drawings illustrates a timeout circuit 10 connected to a conventional CO or PBX key telephone line circuit 11 shown in FIG. 2. The timeout circuit comprises a cluster of neon lamps 12 through 18 connected to lines 1 through 7 through current limiting resistors RO. The neon lamps are coupled to a photoconductive cell 19 which is connected to a capacitor C1 of a timedelay circuit comprising transistors Q1 and Q2, Zener diode Z1, timing resistor R1 and biasing resistors R2 through R4. In the idle state capacitor C1 is charged to the breakdown voltage of Zener diode Z1 through resistor R1. Zener diode Z1 conducts holding transistor Q1 on and transistor Q2 off as commonly known in the art. The precise interrelation between the timeout circuit 10 and the conventional C0 and PBX line circuit 11 will be readily ascertained from the following description of the major circuit functions of the key telephone line circuit which is shown in FIG. 2 only to the extent necessary for the understanding of the invention.

INCOMING CALL

When ringing current is applied to the ring lead R of a line on an incoming call from central office C0 or a private branch exchange PBX, the AC component flows through contacts AH-1 of relay AH, resistor R, capacitor C, thermistor T, and the secondary of relay R to tip lead T on one-half of the cycle, and through diode D to tip lead T on the other half-cycle. Contacts AH-1 of relay AH and A-1 of relay A shunt the winding of relay H and varistor V, and serve to bypass ringing current and prevent the establishment of a false-hold condition which might otherwise occur when a number of ringers are bridged across the station side of the line. The varistor V1 protects diode D and thermistor T from transient currents. The resistor R protects the varistor V1 and diode D from lightning surges. The thermistor T has a cold resistance in the order of 50,000 ohms which prevents relay R from operating when ringing current is first applied, preventing false operation on disconnections or other transients. Power absorbed from the ringing current increases the temperature of the thermistor T and reduces its resistance to the order of 3,000 ohms in about half a second permitting sufficient current to flow to operate the R relay on the half-wave rectified current.

The operation of relay R closes contacts R-2 and applies ground to start lead ST to start the interrupter 20. Interrupter 20 is shown in block form inasmuch as such equipment is conventional, generally consisting of motor-driven cams which operate contacts to provide the desired interruption rates for both visual and audible signalling. Interrupted lamp current for the station signalling lamp is supplied from the interrupter 20 by way of lead LF contact R-3 of relay R, contact AH-3 of relay AH and lead L.

Ringing current is supplied from interrupter 20 by way of lead RN through contacts R-4 of relay R and thence to audible signal source 21 which is also of the conventional type.

When a line is called, the ringing current energizes the secondary winding S of relay R as mentioned previously, operating it. The ringing current also lights neon lamp 12 which is connected across the central office or private branch line. The light from lamp 12 causes the resistance of the photoconductive cell 19 to decrease and capacitor C1 to discharge through the photconductive cell. When the voltage across the capacitor C1 drops below the breakdown voltage of the Zener diode Z1, the diode will stop conducting and transistor Q1 will turn off turning on transistor Q2 as commonly known in the art. Transistor Q2 collector current will flow through lead LK contacts AH-2 of relay AH contacts R-1 of relay R and the primary winding of relay R thereby holding relay R operated.

When the ringing cycle from the central office has stopped, the neon lamp will turn off, the resistance of the photoconductive cell will increase and the capacitor C1 will start charging toward the supply voltage. The charge time of capacitor C1, however, is longer than the period between ringing cycles so that under normal conditions the capacitor C1 will not charge up to the breakdown voltage of Zener diode Z1. Consequently, transistor Q1 will remain off and transistor Q2 will be held on to hold relay R operated between ringing cycles.

TIME OUT

If the next ringing cycle is not present as it happens when the calling party hangs up, then capacitor C1 continues to charge to the breakdown voltage of Zener diode Z1 to turn on transistor Q1 turning off transistor Q2. Consequently, the operating path of the primary winding of relay R is open and relay R is released stopping the audible and visual signalling.

If another line such as line 2, for example, is called before capacitor C1 has time to charge to the Zener diode break down voltage, transistor Q1 will remain off and transistor Q2 on. The R relay primary winding of both line circuits will lock in parallel and signalling in both line circuits will continue even though one of the calling parties may have hung up. However, since the signalling time is relatively short it does not create much of a disturbance.

With the above timeout circuit the audible and visual signalling will continue, once initiated, until the line is answered (to be described later) or there is no central office ringing current on any line sharing the same timeout circuit. In all other cases, the audible and visual signals on a line will stop after a predetermined time interval even if some of the lines are in use.

FIG. 3 of the drawings illustrates an alternative timeout circuit using a unijunction transistor in place of transistor Q1 in the circuit described in FIG. 1. In this circuit the unijunction transistor Q1 serves as an oscillator with a period that is longer than the period between ringing cycles from the central office. If no lines are ringing capacitor C1 will charge up to the peak point voltage of the unijunction transistor through resistor R1 and trigger the unijunction transistor. The capacitor C1 will discharge through the emitter-base one junction to the unijunction transistor valley point voltage as commonly known in the art and a pulse will be applied to the base of transistor Q2 which will turn it off. Once the voltage across capacitor C1 has reached the valley point voltage the unijunction will turn off and capacitor C1 will again start charging toward the peak point voltage. The cycle is repeated and Q2 alternates between conduction and nonconduction. This is without consequence, however, since in the idle state, relay R is not operated.

If ringing current is present on a central office line, the neon lamp connected to that line will fire and the relay R of that line will be energized. The capacitor C1 will discharge through the photoconductive cell during the ringing cycle and the unijunction transistor will not fire thus maintaining transistor Q2 conductive. When the ringing cycle ends, capacitor C1 will begin charging through the timing resistor R1. However, since the charge time of capacitor C1 is larger than the period between ringing cycles from the central office, the unijunction transistor will not have time to fire. Transistor Q2 will remain conductive and relay R will lock up through its own contacts R-1 and contacts AH-2 of relay AH.

If the next ringing cycle is not present due to the calling party having hung up, the capacitor C1 will charge to the peak point voltage of the unijunction transistor. The unijunction transistor will turn on and turn off transistor Q2. This will open the hold path for relay R releasing it. The circuit will then return to its oscillating state.

ANSWERING AN INCOMING CALL

An incoming call is answered by operating a pickup key associated with the line being rung and removing the handset from its mounting as commonly known in the art. Operation of the set switch connects ground to lead A operating relay A. The operation of relay A closes contacts A-2 to operate relay AH, transfers the signal lamp connected to lead L from flashing to steady by way of contacts A-3 connected to a supply voltage, and opens the operating path of relay H at contacts A-4 thus preventing it from operating falsely. The operation of relay AH operates contacts AH-2 and opens the locking path of relay R allowing it to release. In addition, the operation of relay AH disconnects the ringing bridge from the ring of the line at contacts AH-1 and prepares a circuit for the LW lead to the signal lamp at contacts AH-4.

HOLDING

An incoming or outgoing call can be held by operation of the hold key in the telephone set. The operation of the hold key opens a ground on lead A and permits relay A to release. The release of relay A closes the operate path of relay H at contacts A-4 allowing it to operate on line current through the telephone set, prepares a holding path for the slow-release relay AH at contacts A-5 and transfers the signal lamp from steady to winking over the path previously prepared by the operation of relay AH (contacts AH-4 and A-3). The operation of relay H closes its own contacts H-1 connecting its own winding in series across the line as a holding bridge, closes a holding path for the slow-release relay AH at contacts H-2 in time to prevent its release, and grounds the HA lead at contacts H-3 to start the interrupter for lamp winking. The varistor V is in parallel with the winding of relay H to stabilize the sensitivity of the H relay when subjected to varying voltages.

RELEASE OF THE HOLDING BRIDGE BY STATION

When any station of the key telephone system seizes the line by operating the associated pickup key and removing the handset from the mounting, relay A is operated, opening the locking path of relay H at contacts A-4 causing it to release and remove the holding bridge at contacts H-1. This restores the circuit to the talking condition.

I claim:

1. In a telephone system comprising a plurality of key telephone line circuits each including signalling means and means responsive to ringing current from a line for operating said signalling means, the improvement comprising a timeout circuit common to all of said line circuits, said timeout circuit comprising a neon lamp for each line circuit, a photoconductive cell coupled to all of said neon lamps, and a time delay circuit energized by the photoconductive cell in response to ringing current in any of said line circuits, said time-delay circuit comprising a timing circuit including a resistor and a capacitor and a solid-state switching circuit operated by said timing circuit, said switching circuit comprising a first normally conductive transistor connected in series with a normally nonconductive second transistor, the base of the second transistor being connected to the collector of the first transistor and the base emitter junction of the first transistor being connected in series with a Zener diode across said capacitor, the capacitor being adapted to discharge through the photoconductive cell and render the first transistor nonconductive and the second transistor conductive when ringing current is present in any of the lines, and to charge to the breakdown voltage of the Zener diode and render the first transistor conductive and the second transistor nonconductive within a predetermined time interval after ringing current has stopped in all of the lines.

2. The invention defined in claim 1 wherein the means for operating the signalling means is a relay having a primary and a secondary winding, the secondary winding being energized by the ringing current for operating said signalling means and the primary winding being connected to the collector of said second transistor for holding said signalling means operated in the interval between ringing cycles and for releasing it after said predetermined time interval.

3. The invention as defined in claim 2 wherein said primary winding is connected to said second transistor through means for releasing the primary winding upon answering of the incoming call.

4. In a telephone system comprising a plurality of key telephone line circuits each including signalling means and means responsive to ringing current from a line for operating said signalling means, the improvement comprising a timeout circuit common to all of said line circuits, said timeout circuit comprising a neon lamp for each line circuit, a photoconductive cell coupled to all of said neon lamps, and a time-delay circuit energized by the photoconductive cell in response to ringing current in any of said line circuits, said time-delay circuit comprising a timing circuit including a resistor and a capacitor and a solid-state switching circuit operated by said timing circuit, said switching circuit comprising a first unijunction transistor having emitter, base one and base two electrodes and a second normally conductive transistor having emitter, base and collector electrodes, the base of said second transistor being connected to base two of said first transistor through a resistor, said capacitor being connected across the emitter-base one electrodes of said first transistor whereby said first transistor is caused to be nonconductive and the second transistor is caused to be conductive when ringing current is present in any of said lines, and whereby said first transistor is caused to be conductive and said second transistor is caused to be nonconductive within a predetermined interval after the ringing current has stopped in all of said lines.

5. The invention defined in claim 4 wherein the means for operating the signalling means is a relay having a primary and a secondary winding, the secondary winding being energized by the ringing current for operating said signalling means and the primary winding being connected to the collector electrode of said second transistor for holding said signalling means operated in the interval between ringing cycles and for releasing it after said predetermined time interval.

6. The invention as defined in claim 5 wherein said primary winding is connected to the collector electrode of said second transistor through means for releasing the primary winding upon answering of the incoming call to disable said signalling means.